United States Patent [19]

Rothwell, Jr. et al.

[11] Patent Number: 4,920,459
[45] Date of Patent: Apr. 24, 1990

[54] ARC DISCHARGE HEADLAMP SYSTEM

[75] Inventors: Harold L. Rothwell, Jr., Georgetown; George J. English, Reading, both of Mass.

[73] Assignee: GTE Products Corporation, Danvers, Mass.

[21] Appl. No.: 287,925

[22] Filed: Dec. 21, 1988

[51] Int. Cl.⁵ .............................................. B60Q 1/02
[52] U.S. Cl. ...................................... 362/61; 362/80; 362/263; 362/265
[58] Field of Search ................... 362/61, 80, 263, 265, 362/362

[56] References Cited

U.S. PATENT DOCUMENTS

| | | | |
|---|---|---|---|
| 3,700,881 | 10/1972 | Slomski | 362/265 |
| 4,714,986 | 12/1987 | Wurster | 362/263 |
| 4,744,636 | 9/1988 | Gaugel et al. | 362/263 |
| 4,754,373 | 6/1988 | Otto et al. | 362/263 |

Primary Examiner—Ira S. Lazarus
Assistant Examiner—Sue Hagarman
Attorney, Agent, or Firm—William E. Meyer

[57] ABSTRACT

A arc discharge headlamp system is disclosed. An arc discharge headlamp system may be formed with a lamp housing including an enclosed reflector, a double ended arc discharge lamp having a two leads at offset ends, enclosed in the reflector. A first lamp support for the front end of the lamp is coupled to the lamp housing, and a first lead connection for the lamp is coupled through a high potential conductor embedded in the lamp housing. The high potential conductor embedded in the lamp housing extends subsurface to a ballast cavity formed in the lamp housing and enclosing a ballast. The ballast is potted in the cavity to protect it. A second lamp lead extends through a second lamp support to the rear of the lamp housing to be connected to the ballast. The lamp capsule, high potential leads, and ballast are all securely enclosed as a single unit with potential leakage between elements, and with the outside prevented.

19 Claims, 5 Drawing Sheets

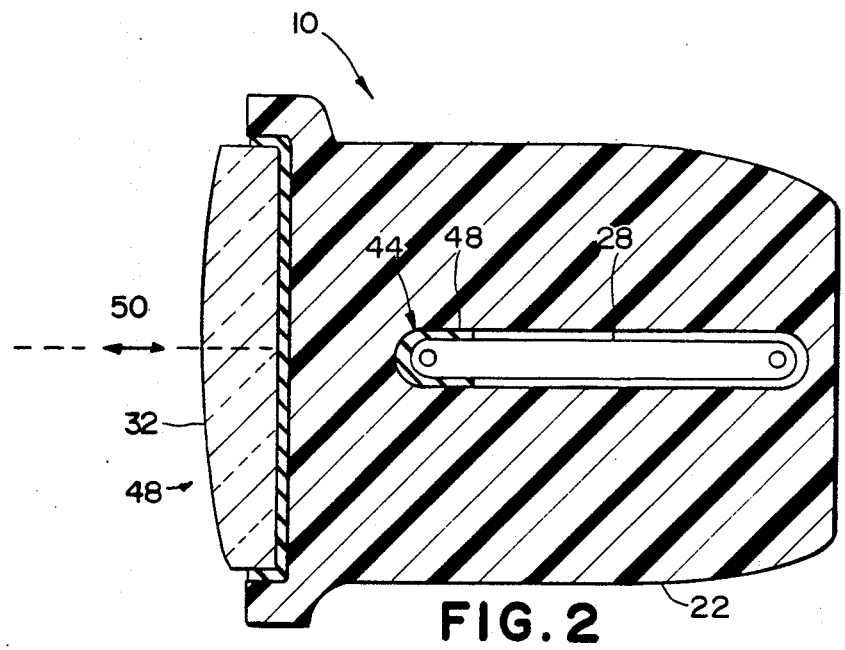
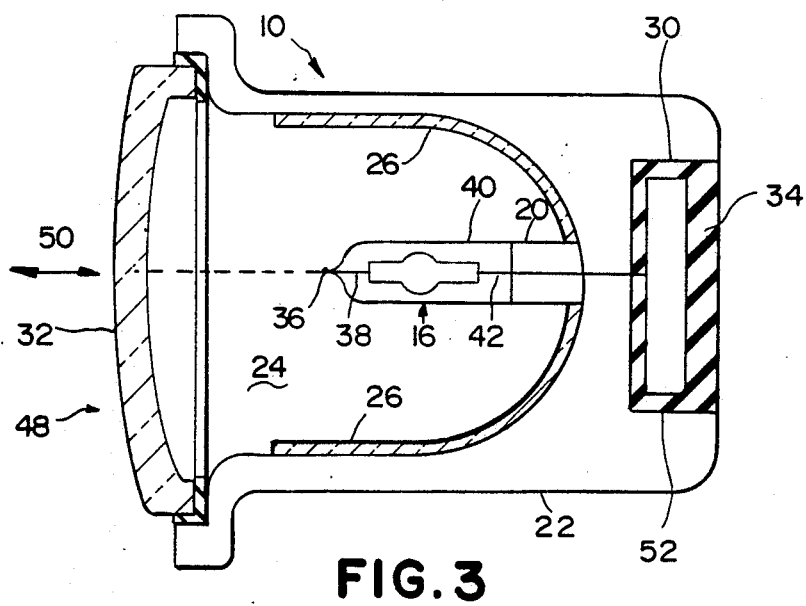

ARC DISCHARGE HEADLAMP SYSTEM

TECHNICAL FIELD

The invention relates to automobile headlamps and particularly to arc discharge automobile headlamps. More particularly the invention is concerned with an arc discharge automobile headlamp system with a plastic reflector body having embedded electrical elements.

BACKGROUND ART

Arc discharge lamps are known to be both efficient and to produce a high quality white light. In essence, an electric arc is formed by an electric potential between two electrodes causing electrons to flow between the electrodes thereby heating the intermediate gas. The heated gas discharges by radiating light and is three to four times more efficient than a heated tungsten filament at producing light. The arc discharge may also have a higher brightness than tungsten. Historically arc discharge lamps were formed with openly exposed electrodes. These early lamps were large, consumed large amounts of electricity, were very hot but had a large light output. The early arc discharge lamps were used as search lights and movie stage lights. Currently small, enclosed arc discharge lamps are made for many special applications, and the trend generally is to reduce the size, power, and heat of a discharge lamp. The high efficiency and high quality light of an arc discharge lamp can then be brought to the small scale of common lighting needs.

To separate the electrodes and help prevent arc over between the inputs, arc discharge lamps are frequently double ended. The two lamp leads then approach the lamp from opposite sides thereby enhancing the separation between the leads. To increase the efficient light output of the lamp, a reflector may be added which commonly supports a portion of the lamp. The double ended lamp may be oriented transverse to the reflector axis, but since the arc is approximately linear between the electrodes, it is usually more useful to orient the electrodes so the arc is parallel with the reflector axis. One lamp lead is then brought through the reflector base near the point where the optical axis meets the reflector, while the other second lead is connected straight out the front of the lamp. The front connection may be made by an appropriately convenient means. Examples of the open ended arc discharge reflector lamps are shown in U.S. Pat. Nos. 3,624,600; 3,700,881 and 3,988,626.

Arc lamps like other lamps are subject to dirt, weather, probing human hands and other interferences. Covering the reflector with a lens protects the lamp structure, and preserves the reflector surface. The problem arises as to how the front electrode may be connected. One solution is to extend the front electrode connection through the lens cover, and make whatever convenient connection is available in front of the lens. Examples of sealed arc discharge reflector lamps where the electrode extends through the lens may be seen in U.S. Pat. Nos. 3,364,374; 3,684,908, 4,290,097, 4,423,348 and 4,686,419.

An electrode extending from the front of a lamp invites electrical and mechanical problems. When arc discharge lamps were special lights, the exposed elements could be expected to be treated with care by attentive users. As discharge lamps become more common, less care can be anticipated, so a means of enclosing the front lead has developed. The front of the lamp is connected inside the enclosed reflector. The front lead is then ducted out through the reflector body at a position offset from the rear electrode. The difficulty is arc discharge lamps rely on a high voltage difference for restart, and reflectors are commonly metal, or metalized surfaces. The reflector can then act as a pathway for arc over between the lamp leads. Examples of sealed arc discharge reflector lamps where the electrode is connected inside an enclosed reflector may be seen in U.S. Pat. Nos. 3,610,912, 3,731,133, 3,808,496, 4,423,471 and 4,724,352.

Since an arc discharge lamp has higher brightness, and proportionately less infrared radiation, automobile headlamps may be made that are more efficient, and more compact. Tungsten filament lamps commonly have a rated lifetime of about 500 to 1000 hours, but arc discharge lamps typically have a lifetime of thousands of hours. Filaments may break under the jouncing stresses of road conditions, but an arc discharge lamp has no filament. An automobile arc discharge lamp can then be designed to last for the life of a car.

In arc discharge lamps, unlike tungsten filament lamps, the range of useful light output may be significantly altered by changing the applied current, surrounding magnetic or electric fields. Arc discharge lamps may output light with a color temperature from 2000 to 10,000 degrees Kelvin, while tungsten lamps may range from 2000 to 3000 degrees Kelvin. Discharge lamps can also operate with currents that vary by a factor of two or more, while tungsten lamps have a severely degraded lifetime if operated at only a few percent above specification. In combination then, discharge lamps offer the possibility of being operated to change direction, intensity or color according to the specific weather, and road conditions. Low beams can be turned to be high beams, and regular lights can become fog lights. An arc discharge automobile headlamp offers the possibility of a better, more flexible lamp, in a smaller package that rarely if ever needs to be replaced.

Automobile headlights are particularly demanding on the lamp specifications. Weather, dirt, constant jarring, and other environmental affects have to be taken into consideration in a practical design. Specific light patterns, light quality, and requirements for durability and long life are set by regulatory agencies, and car manufacturers. The focus and beam pattern of an automobile headlamp is critical to its legal and commercial acceptance. With small volume headlamps the focal point is very finely defined. In general, the smaller the lamp package, the more exacting the positioning of the light source. Tungsten lamps are usually positioned mechanically with the aid of feed back from positioned flux sensors. Arc discharge headlights are now being adapted for use as automobile headlamps. Examples of include U.S. Pat. No. 4,594,529 issued to Bertus de Vrijer on Jun. 10, 1986 for a metal halide discharge lamp; U.S. Pat. No. 4,722,039 issued Jan. 26, 1988 to Manfred Gaugel for a shaded beam vehicular discharge type head lamp, and Japanese Pat. No. 62-131459 disclosed Jun. 13, 1987 for capped discharge lamps for headlights. Applicants show in two related U.S. patent applications, Ser. Nos. 144,828 and 144,836 both filed on Jan. 14, 1988, a magnetic means to control an automobile headlight with an arc discharge lamp positioned in a sealed reflector cavity.

To produce instant light, that is, light immediately after switching the light on, an arc discharge lamp capsule requires high gas pressure, which inturn requires a high ignition voltage. When the lamp is cold, the lamp fill pressure may be less than one atmosphere, in which case the minimal cold starting voltage may be as small as 2000 volts, depending on the electrode separation, starting voltage pattern, and other known lamp aspects. After the lamp has been on, the internal lamp pressure may rise because of fill temperature to ten, twenty, thirty or more atmospheres. Since, the ability to draw electrons across the electrode gap is approximately proportional to the product of the pressure and the gap distance, hot restart requires a voltage that is then ten, twenty, thirty or more times as great as the minimal cold start voltage.

A reliable instant hot start is clearly necessary in an automobile headlamp, and high or very high voltages are therefore considered necessary. High voltages are progressively more difficult to insulate. Vacuum and gas are effective insulators. Any close positioning of input leads invites arc over, resulting in a failure to restart the lamp. For example, high voltage arcing may occur along the envelope surface between the lead entry points in a capsule, across open spaces to nearby objects, or through wet, oily, aged or otherwise degraded insulation. Lead separation and high quality lead insulation are important to assure hot restart.

As a comparison, automobile spark plug wires commonly conduct voltages of about 20,000 volts. It is common knowledge that spark plug wires age, and leak to nearby objects, especially when wet, soiled or oily. The high voltages might also arc to nearby car parts, or humans if the electrode was ducted through the front of the lamp or the side of the reflector. Similarly, to reduce headlight volume, the reflector cavity must be small, which therefore limits the possible lamp lead separation in the reflector cavity.

Including the lamp leads inside the lamp capsule is not felt to adequately insulate the leads. Arcing can occur along glass surfaces, or across lamp cavities between metal sections. High electric fields induced by high voltages can devitrify glass, and otherwise break down insulating materials in time. Also, even if the arc over is prevented inside the lamp capsule, the same problems can arise between the leads in places exterior to the capsule.

More broadly, to gain greater performance from headlights while at the same time reducing the size of the lamp enclosure, the methods of producing light are generally pushed to use more extreme conditions. The extreme conditions in turn at times need special controls, and protections; and inturn the users of sophisticated headlights may need protection from the conditions, and controls. There is then a need to provide a headlamp with sophisticated controls without being degraded by the adverse conditions in an automobile, and without offering possible harm to ordinary users.

Various arc discharge headlamps systems are shown by existing patents or published patent applications. EPO 231,936 to Fritz Eckhardt, DG 245,080; to Uwe J. Among et al; EPO 245,735 to Jurgen Heider et al.; DG 3519627 to Manfred Gaugel et al.; DG 3040583 to Jurgen Fischer; EPO (application) to Shinji Inuki et al.; UK 2,186,957 to Toru Segoshi; EPO (application) 0,224,954 to Rudolf Sanders; UK (application) 2,123,541 to Gyorgy Szekacs.

DISCLOSURE OF THE INVENTION

An arc discharge headlamp system may be formed from a lamp housing including an enclosed reflector, a double ended arc discharge lamp having a first connection at a first end and a second connection at a second end substantially offset from the first connection, enclosed in the reflector, a first lamp support for the first end of the lamp coupled to the reflector, a first electrode connection for the first end of the lamp coupled through the reflective surface at a first reflector position, a second lamp support for the second end of the lamp, coupled to the reflector, a second electrode connection for the second end of the lamp, coupled through the reflective surface at a second reflector position and offset from the first reflector position, and a surface connector, connected to the second electrode connection, embedded in the lamp housing, and extending in the lamp housing to a third housing position to receive input current.

BRIEF DESCRIPTION OF THE DRAWINGS

FIG. 2 shows a horizontal cross sectional view of the double lamp arc discharge headlamp of FIG. 1 taken at 12.

FIG. 3 shows a horizontal cross sectional view of the double lamp arc discharge headlamp of FIG. 1 taken at 14.

BEST MODE FOR CARRYING OUT THE INVENTION

Figure 1:
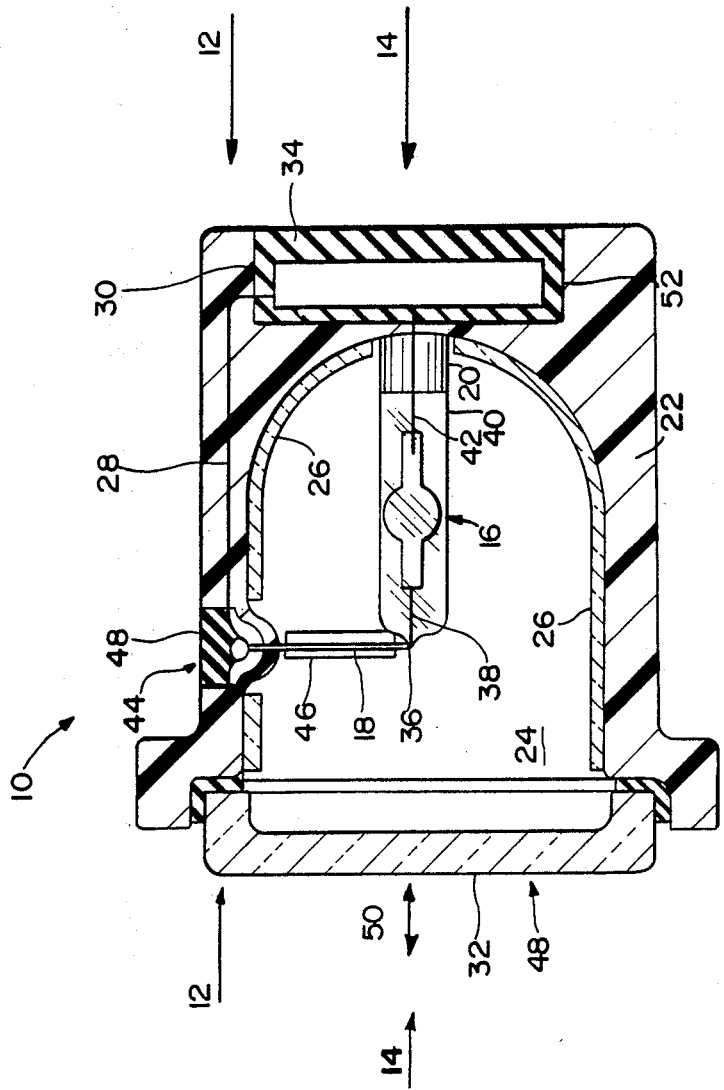
FIG. 1 shows a vertical cross sectional view of a preferred embodiment of a double lamp arc discharge headlamp system.

FIG. 1 shows a vertical cross sectional view of a preferred embodiment of a double lamp arc discharge headlamp system. FIG. 2 shows a horizontal cross sectional view of the double lamp arc discharge headlamp of FIG. 1 taken at 12, and FIG. 3 shows a similar horizontal cross sectional view of the double lamp arc discharge headlamp of FIG. 1 taken at 14. The arc discharge headlamp system 10 includes an enclosed arc discharge lamp capsule 16, held by a front support 18, and a rear support 20 in a lamp housing 22. The lamp housing 22 includes a reflector cavity 24, with a reflective surface 26, an embedded first high potential conductor 28, and a ballast cavity 30. The reflector cavity 24 is closed by a covering lens 32, and the ballast cavity 30 includes a ballast 34.

In the preferred embodiment, the double ended arc discharge lamp capsule 16 is a double envelope arc discharge lamp. The lamp capsule 16 has a front end 36 and a first lamp lead 38 facing the front of the lamp system 10 and a rear end 40 and a second lamp lead 42 facing the rear of the lamp system 10. The first lamp lead 38 and second lamp lead 42 are substantially offset from each other or insulated to limit possible voltage leakage.

The one end of the front support 18 couples with and holds the front end 36. The opposite end of the front support 18 extends up into the lamp housing 22 to a well 44 formed in the upper wall of the lamp housing 22. While it is possible to construct the front support 18 and a separate connection for the first lamp lead 38, it is more practical to form the two as a single piece, such as a stiff conductive metal section. To limit possible arcing to the lamp capsule 16, or the reflective surface 26, the preferred front support 18 is insulated. The preferred front support 18 is then a stiff metal rod with a glass or plastic sleeve 46 and has exposed ends for electrical connection. The rod forming the front support 18 is sufficiently stiff to securely position the front end 36 during vehicle operation. Although, multiple front end 36 lamp supports may be used, one is preferred to minimize the amount of shadowing. Also, while it may be possible to connect the front support 18 to any portion of the lamp housing 22, it is preferable to extend the front support 18 approximately vertically to the lamp housing 22, and thereby place the front support's shadow in the glare portion of the beam.

The reflector cavity 24 includes a cavity opening 48 from which generated light may be projected. The reflector cavity 24 may also include an optical axis 50 passing through and approximately perpendicular with the cavity opening 48. The reflector cavity 24 may include a separate reflector body, or as preferred, formed on the interior surface of the reflector cavity 24 may be a reflective surface 26, such as coating of flashed aluminum. To limit possible leakage to the front support 18, the reflective surface 26 may be formed with a gap in the coating adjacent the front support 18. In the preferred embodiment, the arc discharge lamp capsule 16 is positioned to generate an arc substantially parallel with the optical axis 50.

The lamp housing 22 further includes at least a channel of a nonconductive material in which a first high potential conductor 28 may be positioned without potential leakage. In the preferred embodiment substantially all of the lamp housing 22 is made from an electrically insulating material of sufficient thickness that a high potential conductor 28 may be safely positioned within a wall of the lamp housing 22. The preferred lamp housing material is an electrically insulating plastic such as a thermal plastic or thermal setting plastic. The lamp housing material is preferably injection moldable, has a surface quality sufficient to accept a flashed aluminum reflective surface 26, and tolerant of a moderate heat load. Mineral or glass filled plastic is felt to be acceptable, while a plastic with an electrically conductive fill is not thought likely to be as successful. Conduction of heat by the lamp housing 22 is useful, and materials with good heat conduction are preferred.

The front support 18 connects to the first high potential conductor 28 in the well 44. The front support 18 and first high potential conductor 28 may be welded together, and the well 44 then filled with an electrically insulating potting material 48. The first high potential conductor 28 extends from the well 44, below the surface of and through the body of the insulating material of the lamp housing 22 to the ballast cavity 30. In the preferred embodiment, the first high potential conductor 28 is injection molded in the lamp housing 22. Alternatively, a channel may be formed in the lamp housing 22 to include the high potential conductor 28 with a surrounding potting material. Injection molding protects the high potential conductor 28 from moisture, dirt, and other contaminants that may degrade the high potential conductor performance.

An arc discharge lamp capsule 16 usually requires a controlled power source, typically a circuit positioned intermediate the lamp capsule 16 and a line source, to start and regulate the current through the lamp capsule 16. A ballast, such as ballast 34, commonly generates a high voltage spike to start the arc, and then regulates the current flow to stabilize the lamp arc. If formed as separate units, a lamp housing and a ballast would need an exterior connector to conduct the high potential. Such an exterior conductor could be a leakage source. Such a connector then offers the same possibility for current leakage at high potential as do the lamp leads, and therefore the same possibility for restart failure. In addition, an exterior connector could be subject to the detrimental affects of water, dirt, oil and other residues encountered in an automobile environment. For spark plug wires, an example of similar high potential conductors, there is an inherent fail safe condition, because a car slows or stops on excessive potential leakage. For headlight failure, no such fail safe condition exists. The problem of lights failing at high speed is evident. An exterior high potential conductor would therefore need a high quality insulation to tolerate high potential without leaking.

The preferred embodiment solves the problem by including in the lamp housing 22 an embedded high potential conductor 28 leading to a ballast cavity 30 for connection with a ballast 34. The second lamp lead 42, may be extended directly to the ballast cavity 30 for connection with the ballast 34, or a connection may be made by way of a second embedded high potential conductor. The embedded high potential conductor 28, or conductors if both leads are so connected, may then be joined internally to the ballast 34, thereby denying all possibility of exterior potential leakage through lead failure, or detrimental conditions.

Applicants prefer a constant current ballast 34 providing a starting voltage of 15,000 volts, pulsed at a rate of 250 cycles per second. Constant wattage ballasts may be used, but are felt to be generally more expensive to construct. Ballast design and operation is known, and may be accomplished by numerous means, so further discussion of the ballast 34 is felt to be unnecessary. A ballast 34 may be formed from common electronic components, for example, as a small circuit board, and then embedded in the lamp housing 22 to assist in starting and operating the lamp capsule 16. The ballast 34 may be housed in a sealed ballast cavity 30 formed as a part of the rear portion of the lamp housing 22. An epoxy or similar potting material 52 may be used to back fill the remaining portions of the ballast cavity 30 thereby sealing the ballast 34 and connections from moisture, and other detrimental influences. Potting the ballast 34 is thought to be an advantage, since potting material 52 while being electrically insulating may simultaneously be thermally conductive. The lamp housing 22, and potting material 52 may then be used to conduct heat away from the electrical components, including the ballast 34. Electrically insulating, thermally tolerant potting materials are known in the art.

Figure 4:
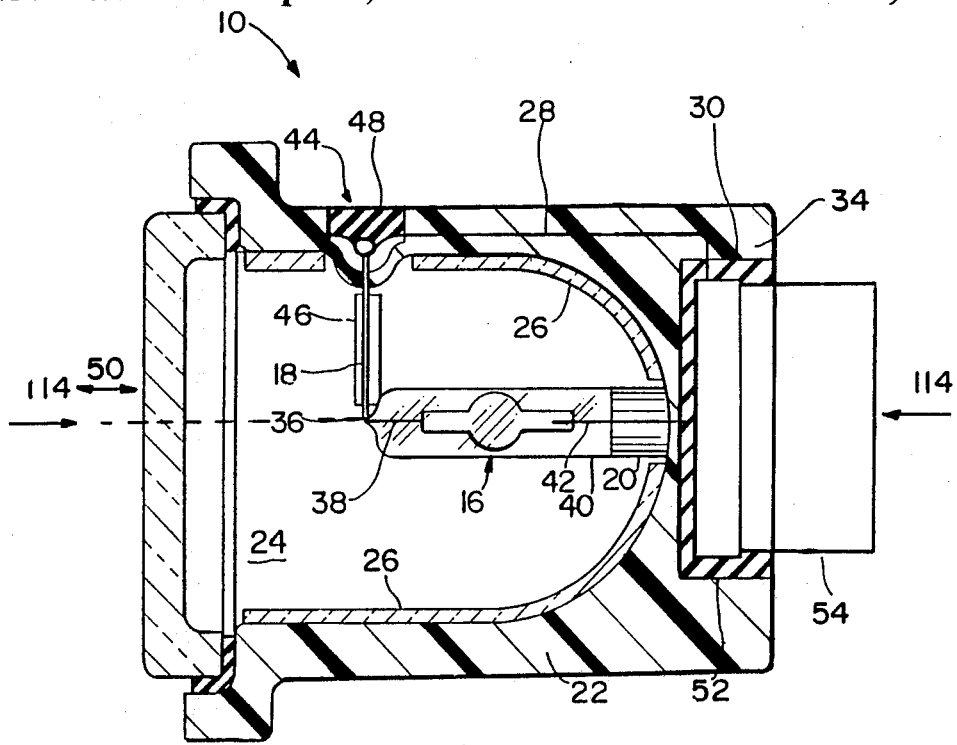
FIG. 4 shows a vertical cross sectional view of a alternative embodiment of a double lamp arc discharge headlamp system with cooling fins.
Figure 5:
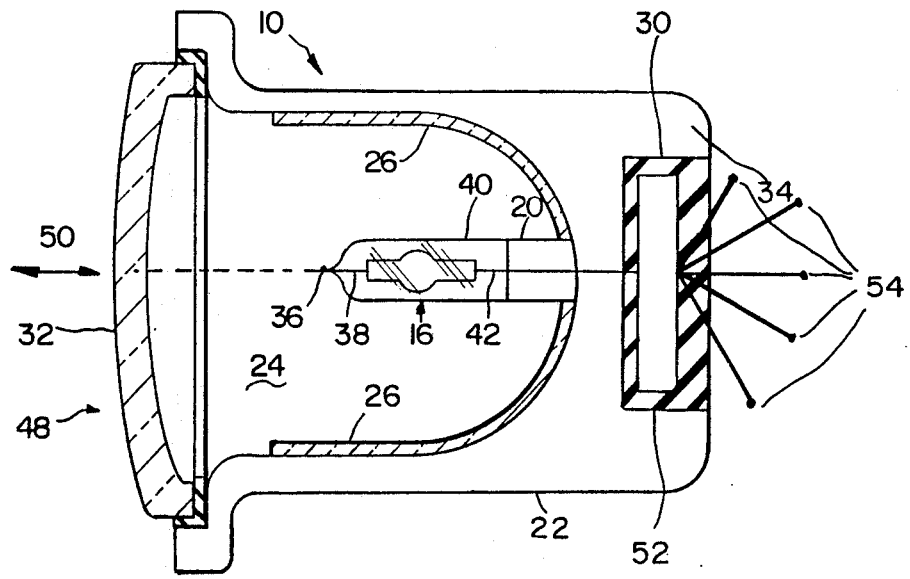
FIG. 5 shows a horizontal cross sectional view of the double lamp arc discharge headlamp of FIG. 4 taken at 114.

In an alternative, although less preferred design, a lamp ballast 34 may include electronic elements requiring additional cooling fins 54. It is anticipated that heat conductive cooling fins 54 extending from the ballast 34 components to circulating air may be required in some designs. Any such cooling fins 54 may then extend from the ballast cavity 30, and surrounding potting material 52, but not be covered by the potting material 52 to interfere with cooling. FIG. 4 shows a vertical cross sectional view of a alternative embodiment of a double lamp arc discharge headlamp system 10 with cooling fins. FIG. 5 shows a horizontal cross sectional view of the double lamp arc discharge headlamp of FIG. 4 taken at 114.

The lamp capsule 16 at the rear end 40 is coupled to the lamp housing 22 near the base of the reflector cavity 24 for support. The coupling may be made by numerous methods including a formed portion on the rear end 40 designed to couple with a complementary receptacle formed on the lamp housing 22. Alternatively, an interlinking piece may couple the lamp capsule 16 to the lamp housing 22, or the lamp capsule 16 may extend through the lamp housing 22, to be coupled to the ballast 34. In each case, the second lamp lead 42 extends from the lamp capsule 16 to the lamp housing 22, and is preferably shielded along the way. The second lamp lead 42 may also be coupled in a similar fashion to a second embedded high potential conductor leading to the ballast cavity 32 for connection with the ballast 34. In the preferred embodiment, the rear support 20, formed as a ceramic piece, holds the lamp capsule 16 at rear end 40, and is in turn coupled to the adjacent lamp housing 22. The second lead 42 extends directly through the lamp housing 22 to the ballast 34 for connection. Either the second lead 42 may be insulated, or the reflective surface 26 may be offset from the second lead to prevent potential leakage.

Formed in the lamp housing 22 to receive the supplied automobile current, typically 12 volts, and appropriate control signals, if any, may be a standard plug connector 56. The lamp capsule 16 may be enclosed in the lamp housing 22 by sealing the reflector cavity 24, with a glass or plastic covering lens 32 coupled or sealed to the lamp housing 22 by known means.

Figure 6:
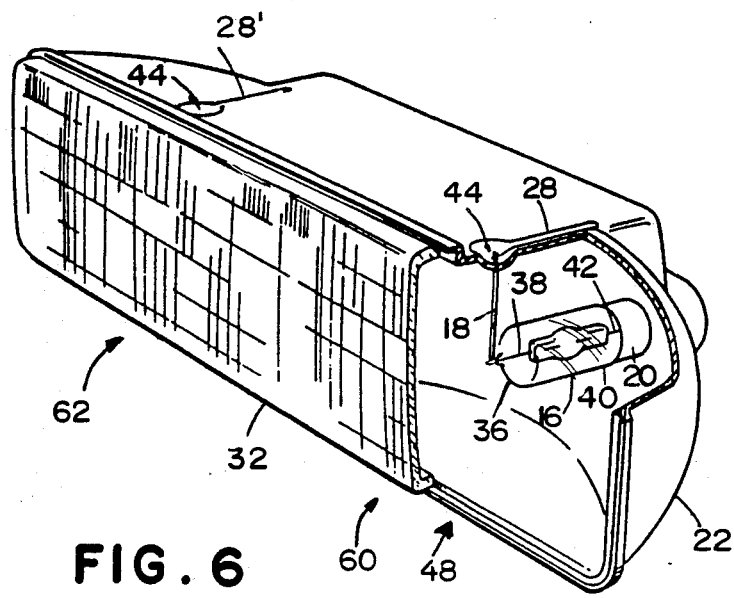
FIG. 6 shows a front perspective partially cut away of a preferred embodiment of a double lamp arc discharge headlamp system.
Figure 7:
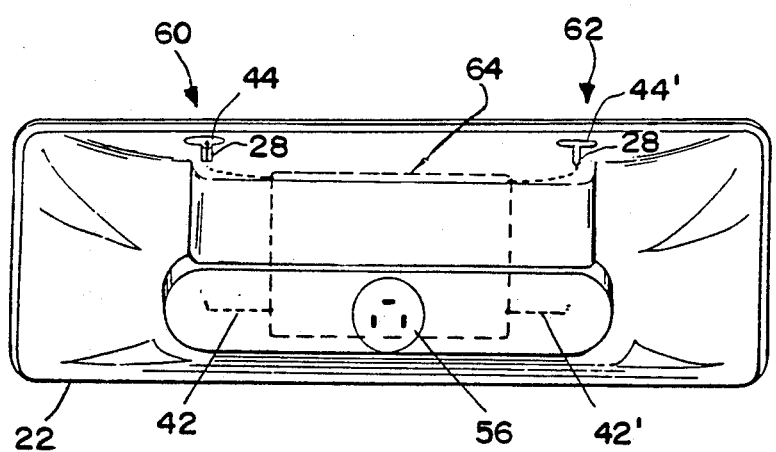
FIG. 7 shows a rear perspective of the double lamp arc discharge headlamp of FIG. 6.

FIG. 6 shows a front perspective partially cut away of a preferred embodiment of a double lamp arc discharge headlamp system. FIG. 7 shows a rear perspective of the double lamp arc discharge headlamp of FIG. 6. The double arc discharge arc discharge headlamp system has two discharge lamps 60, 62 (62 behind an enclosing lens) housed in one lamp housing 22. A common ballast 64 may be used to control both lamp capsules 60, 62. Automobile headlamp systems are commonly made as a group of separately housed lamps with different lamps performing the high and low beam functions, or as combined units organized in a single lamp housing 22. A further alternative in the case of filamented lamps, is to use two filaments in one lamp housing 22. Arc discharge lamps may be similarly grouped as separate singles, or as a team in a single lamp housing 22. Applicants described a different system in the co-pending U.S. applications, Ser. Nos. 144,828 and 144,836 both filed on Jan. 14, 1988, wherein a single arc discharge lamp may be controlled by a magnetic means to produce different beam outputs 58.

The preferred method of assembling the arc discharge headlamp is to first injection mold the lamp housing 22 lamp housing 22, including the embedded high potential conductor 28. A double ended arc discharge lamp capsule 16 is welded at right angles to front support 18. The front support 18 may then be covered by a glass sleeve 46. The rear support 20 is added with the second lead 42 exposed for connection. The lamp capsule 16, front support 18, rear support 20 and sleeve 46 are then positioned in the lamp housing 22. The front support 18 is threaded through the roof of the lamp housing 22 to the contact well 44. The rear, second lead 42 is simultaneously threaded through a rear axial passage. The lamp capsule 16 is then correctly positioned with respect to the lamp housing 22, and held in position while the front support 18, and rear, second lead 42 are welded or otherwise connected. The connector well 44 is then filled with an epoxy potting material 48, or is otherwise sealed with an electrically nonconductive sealant. The ballast 34 is then enclosed in the ballast cavity 30 with the connections to the embedded first high potential conductor 28 and second lead 42 being made. The ballast cavity 30 is then back filled with an epoxy potting material 52, or similar electrically non-conductive sealant leaving any cooling fins 54 exposed to air. The arc discharge lamp capsule 16 is then enclosed by sealing the front of the lamp housing 22 thereby closing the reflector cavity 24 with lens 32.

Figure 8:
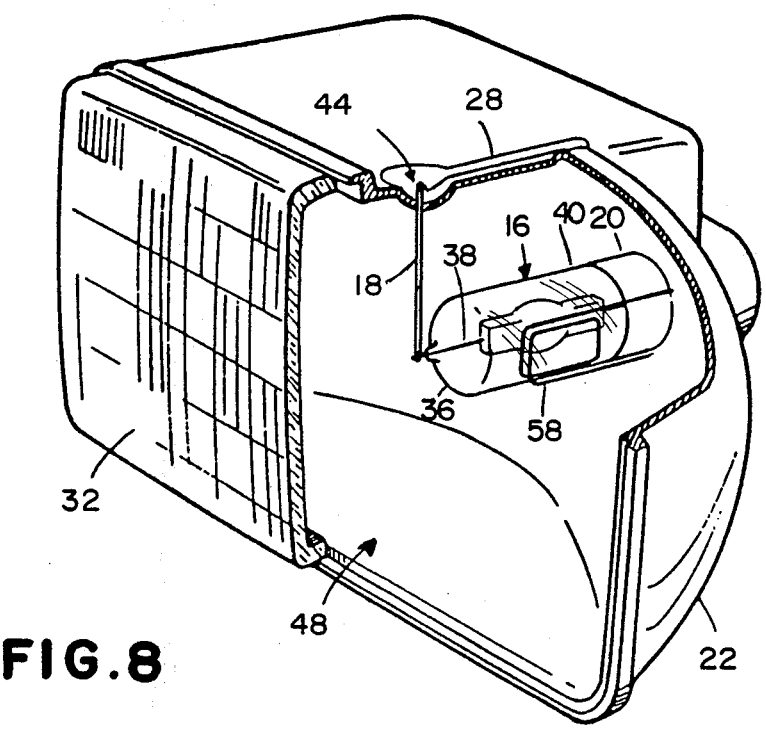
FIG. 8 shows a front perspective partially cut away of a preferred embodiment of a single lamp arc discharge headlamp with a magnetic control.
Figure 9:
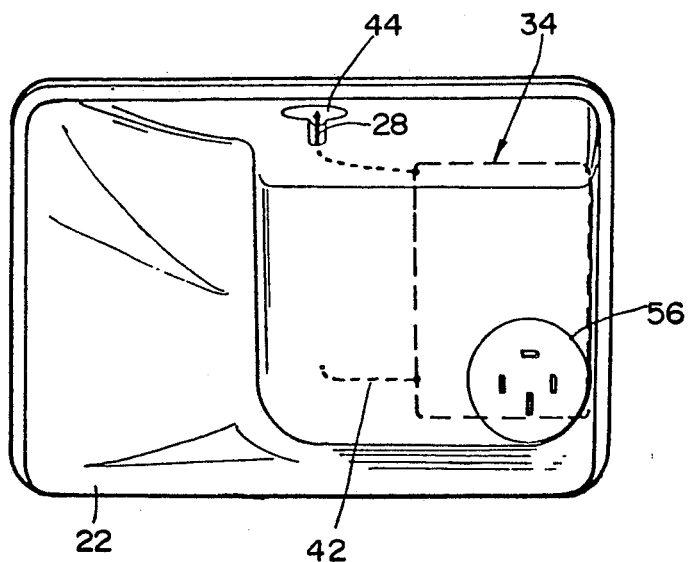
FIG. 9 shows a rear perspective of the single lamp arc discharge headlamp with magnetic control.

A valuable aspect of arc discharge lamps is the fact that the light is generated by a gas discharge, and is not confined to the mechanical boundary of a filament. Gas discharges may be affected by local magnetic, or electrical fields. The glowing gas discharge may then be moved in various directions according to the applied field force. In a similar fashion, the gas discharge temperature may be controlled by the amount or character of the supplied current. Magnetic controls for arc discharge lamps offer numerous adaptations of the arc lamp function to specific purposes or road conditions, including such aspects as continuous variation of lamp brightness, and beam guidance. Beam guidance may be controlled horizontally for turning, and dimming; and vertically for dimming, and beam leveling. The arc diameter may also be controlled for focal or dispersion control. The beam brightness may also be adjusted for ambient light levels, weather conditions, car velocity, oncoming traffic and other sensed conditions either by current control, or position control of the gas discharge. Applicants have described means in U.S. applications Ser. Nos. 144,828 and 144,836 both filed on Jan. 14, 1988, which are hereby incorporated by reference, for locating a magnetic control adjacent the arc discharge lamp to accomplish some of the suggested beam controls. FIG. 8 shows a front perspective partially cut away of a preferred embodiment of a single lamp arc discharge headlamp with a magnetic control. FIG. 9 shows a rear perspective of the single lamp arc discharge headlamp with magnetic control. The electronic controls for the beam control may be coupled to or included with the ballast structure. The beam control circuitry may then also be included in the ballast cavity, potted to be protected from the environment. The required inputs to the lamp housing through the plug could then minimally be a power line acting as a carrier wave for control signals. Alternatively, separate power and control signals may be provided. The control signals may be analog or digital, and may be delivered either individually, or multiplexed, by either human action or sensor output. The simplest control would be the standard high or low beam signal, indicating either a choice between lamp capsules choice or a gas discharge control setting.

The lamp system describes a single body, enclosed lighting system that is generally useful regardless of the light generating, or control means. The lamp system includes a lamp housing formed from an electrically nonconductive, heat resistant plastic material including a reflective surface defining an enclosed reflector cavity, with some means for generating light, such as an arc discharge lamp, positioned and supported in the reflector cavity. The lamp leads for powering the light generating means are coupled through the lamp housing, to a control means. The control means is for operating the light generating means, and is embedded or enclosed in the lamp housing where it receives the leads for the light generating means through the lamp housing, and a receiving low voltage power from an exterior source. A control signal may also be received. A covering lens for closes the reflector cavity including light generating means. The package for the lamp system is resistant to water, oil, salt, and other adverse contaminants typical of the automobile environment. The lamp system package is electrically, and thermally insulated by the lamp housing to protect the lighting means and the included controls, for example circuitry from the exterior. Similarly the user is protected by the unitary package from the lighting means and control system. Only a low voltage power, and where relevant, a control signal, needs to be delivered to the self contained lamp system.

In a working example some of the dimensions were approximately as follows: The double ended arc discharge lamp was four centimeters long with a central lamp volume about 1.0 centimeter long and 0.8 centimeters across. The arc discharge lamp was designed to operate at about 0.5 amperes, and had molybdenum lamp capsule leads about 1.0 mm in diameter. The reflector housing was 7.62 cm (3.0 inch) high, 10.16 cm (4.0 inch) deep and 15.4 cm (6.0 inch) wide.

The disclosed operating conditions, dimensions, configurations and embodiments are as examples only, and other suitable configurations and relations may be used to implement the invention. No particular exterior mounting attachments have been described as mounts may be appropriately molded or appended according to the users selection.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An arc discharge headlamp system comprising:
   a) a lamp housing including an internal surface defining a reflector cavity,
   b) a double ended arc discharge lamp having a first lead at a first end and a second lead at a second end, substantially offset from the first lead, enclosed in the reflector cavity,
   c) a first lamp support coupled to the first end of the lamp, and coupled to the lamp housing,
   d) a first lead connection for the first lead of the lamp coupled through the lamp housing at a first lamp housing position to receive input current,
   e) a second lamp support coupled to the second end of the lamp, and coupled to the lamp housing,
   f) a second lead connection for the second lead of the lamp, coupled through the lamp housing at a second lamp housing position and offset from the first lamp housing position; and
   g) an insulated high potential conductor, connected to the second lead connection, embedded in the lamp housing, and extending in the lamp housing to a third housing position to receive input current.

2. The arc discharge lamp system of claim 1 wherein the reflector cavity has an optical axis extending perpendicular to the lamp housing surface through the reflector cavity to a zone to be illuminated.

3. The arc discharge lamp system of claim 2 wherein the arc discharge lamp is positioned so a generated arc is substantially parallel with the optical axis.

4. The arc discharge lamp system of claim 2, wherein the second support rigidly extends from the lamp housing with a component transverse to the optical axis.

5. The arc discharge lamp system of claim 1, wherein the lamp housing is a plastic material.

6. The arc discharge lamp system of claim 5, wherein the plastic housing material is electrically nonconductive.

7. The arc discharge lamp system of claim 5, wherein the plastic housing material is heat resistant.

8. The arc discharge lamp system of claim 1, wherein the lamp housing further includes a ballast cavity with an included ballast to assist in starting and operating the lamp, the ballast being connected to the first lead, and connected through the high potential conductor to the second lead.

9. The arc discharge lamp system of claim 8, wherein the ballast cavity with the included ballast is otherwise filled with an electrically insulating potting material.

10. The arc discharge lamp system of claim 1, wherein the second support includes a conductive element to serve as the second lead connection.

11. The arc discharge lamp system of claim 10, wherein the second lamp support, and second lead connection are a single rigid metal piece.

12. The arc discharge lamp system of claim 11, wherein the rigid metal piece forming the second lamp support, and second lead connection has an insulating layer.

13. The arc discharge lamp system of claim 12, wherein the rigid metal piece and insulating layer are a rigid metal rod with a glass coating.

14. The arc discharge lamp system of claim 1, further including a covering lens closing the reflector cavity to enclose the discharge lamp capsule.

15. The arc discharge lamp system of claim 1, further including means for affecting the gas discharge tube, the means being positioned in the reflector cavity, adjacent the lamp capsule, and electrically coupled to circuitry enclosed in the lamp housing.

16. An arc discharge headlamp system comprising:
   a) a lamp housing including an internal surface defining a first and second reflector cavity,
   b) a first and second double ended arc discharge lamp having respectively a first lead at a first end and a second lead at a second end, substantially offset from the first lead, enclosed respectively in the first and second reflector cavities,
   c) first lamp supports coupled respectively to the first end of the first and second lamps, and coupled to the lamp housing,
   d) first lead connections respectively for the first leads of the first and second lamps coupled respectively through the lamp housing at a first lamp housing positions to receive input current, e) second lamp supports coupled respectively to the second ends of the first and second lamps, and coupled to the lamp housing, f) second lead connections respectively for the second leads of the first and second lamps, coupled respectively through the lamp housing at second lamp housing positions and offset from the first lamp housing positions, g) insulated high potential conductors, connected respectively to the second lead connections, embedded in the lamp housing, and extending in the lamp housing respectively to third housing positions to receive input current; and h) a common ballast cavity with an included ballast to assist in starting and operating the first and second lamps, the ballast connected respectively to the first leads, and connected respectively through the high potential conductors to the second leads.

17. An arc discharge head lamp system comprising:

a) a lamp housing formed from a electrically nonconductive, heat resistant plastic material including a reflective surface defining an enclosed reflector cavity, the reflective surface having an optical axis extending perpendicular to the reflective surface through the reflector cavity to a zone to be illuminated, b) a double ended arc discharge lamp having a first lead at a first end and a second lead at a second end substantially offset from the first lead, enclosed in the reflector cavity, the arc discharge lamp is positioned so a generated arc is substantially parallel with the optical axis, c) a first lamp support for the first end of the lamp coupled to the lamp housing, d) a first lead for the first end of the lamp coupled through the reflective surface at a first lamp housing position, e) a second lamp support for the second end of the lamp, coupled to the lamp housing, rigidly extending from the lamp housing with a component transverse to the optical axis and joining with the front lead of discharge lamp, and a second lead for the second end of the lamp, coupled through the reflective surface at a second lamp housing position and offset from the first lamp housing position, in the form of a rigid metal rod with a glass coating, f) a surface connector, connected to the second electrode connection, embedded in the lamp housing, and extending in the lamp housing to a third housing position to receive input current, g) a ballast embedded in the lamp housing to assist in starting and operating the lamp, and h) a covering lens closing the housing cavity including the reflector cavity, and discharge lamp.

18. An arc discharge head lamp system comprising:

a) a lamp housing formed from an electrically nonconductive, heat resistant plastic material including a reflective surface defining an enclosed reflector cavity, b) means for generating light positioned and supported in the reflector cavity, c) a first lead and a second lead for powering the light generating means coupled through the lamp housing, d) control means for operating the light generating means embedded in the lamp housing, receiving the leads for the light generating means through the lamp housing, and receiving low voltage power from an exterior source, and e) a covering lens for closing the reflector cavity including light generating means.

19. The arc discharge lamp system of claim 18, wherein the control means further receives a control signal.

* * * * *